Oct. 10, 1939.  G. SLAYTER  2,175,225
METHOD OF MAKING GLASS WOOL
Original Filed Oct. 11, 1934  2 Sheets-Sheet 2
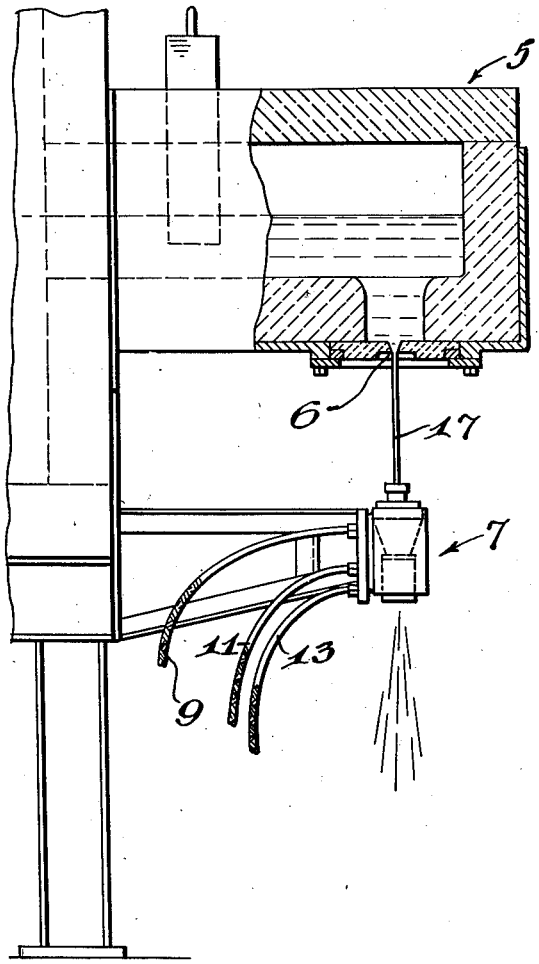
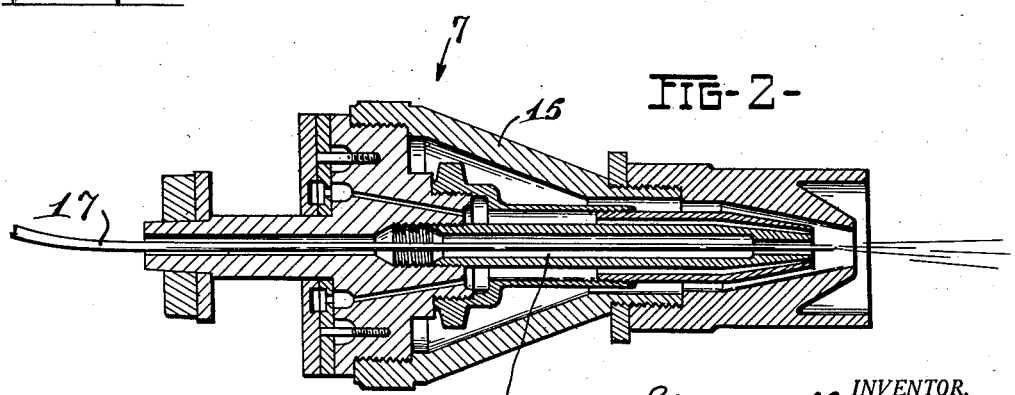

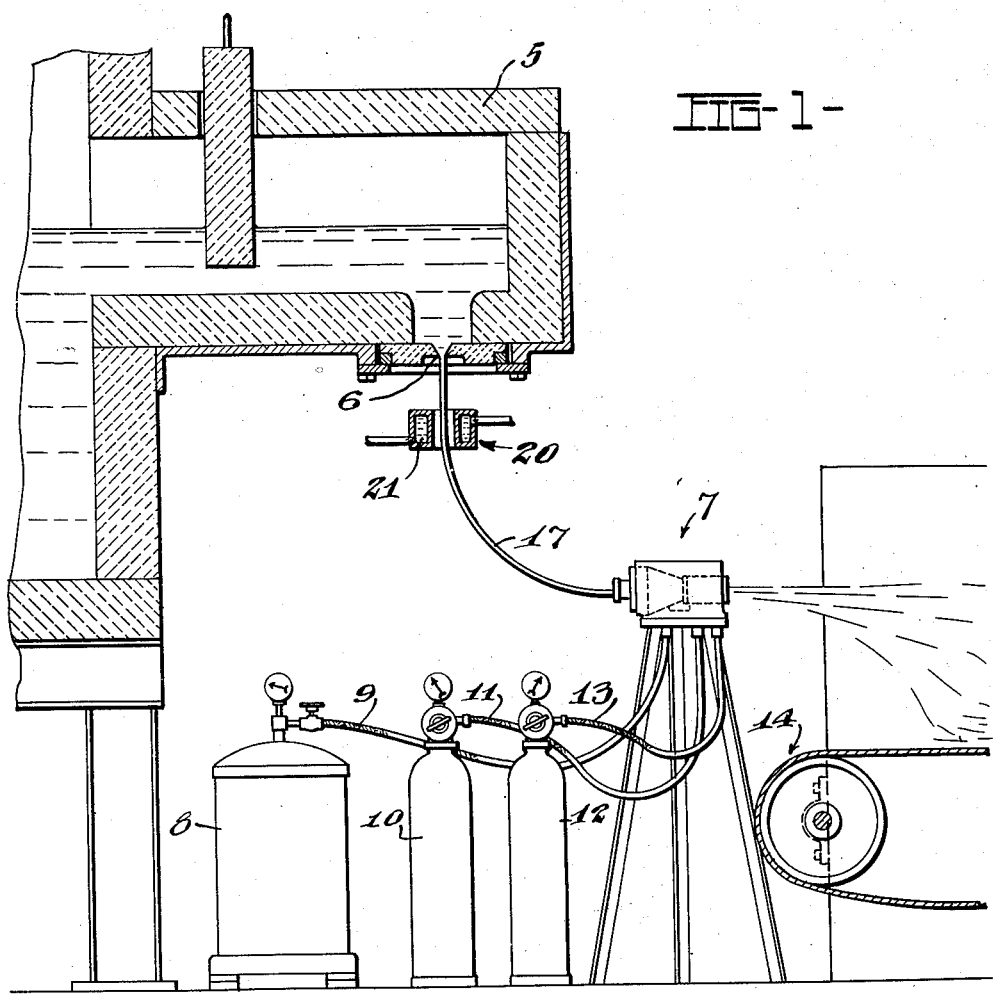

Patented Oct. 10, 1939

2,175,225

UNITED STATES PATENT OFFICE 2,175,225

METHOD OF MAKING GLASS WOOL

Games Slayter, Newark, Ohio, assignor, by mesne assignments, to Owens-Corning Fiberglas Corporation, a corporation of Delaware Application October 11, 1934, Serial No. 747,921
Renewed November 4, 1937

9 Claims. (Cl. 83—91)

My invention relates to the manufacture of wool from glass or like materials, which comprises flowing a continuous stream of the molten material, cooling the stream to a semi-solid or plastic condition and while it is still integrally united with the supply body of molten material, subjecting it to the reheating and drawing action of a high temperature blast.

At the present time there is in vogue a process of making glass wool which comprises subjecting a fine stream of molten glass to a blast of steam or other gas under considerable pressure by which the stream of glass is blown into threads or filaments which are collected as glass wool. This method is satisfactory for making comparatively coarse wool adapted for certain purposes, but is not suited for making very fine wool, such as is required for some other purposes.

I have discovered that a very fine quality of such wool material can be made by subjecting a glass rod to the action of a high temperature blast as in the now well known "metal layer" machine. Glass acts differently from ordinary materials when fed through such a machine, and may be drawn into fine filaments of microscopic diameter and relatively great length, instead of being blown out into a spray of more or less spherical drops as in the case of the ordinary metals, such as brass or iron.

One drawback to the former of the above methods is found in the fact that the temperature of the blast of steam or compressed air is so much lower than that of the stream of molten glass as it comes from the furnace, that it rapidly chills the glass. This increases the resistance of the molten material to the filament forming action of the blast, such action being arrested before the filaments have been drawn out to the fineness that would otherwise be attained. It is found that within considerable limits, the fineness of the filaments produced is substantially proportional to the temperature of the material at the point where it is acted upon by the blast. Attempts have been made to overcome this defect by applying electrical heat to the material just before or at the point where it passes into the blowing nozzle. But this expedient is not altogether satisfactory for various practical reasons which will readily suggest themselves to those skilled in the art.

On the other hand, the metal layer method of producing glass wool from a previously formed glass rod is subject to the objection that the process cannot be made continuous without various complications concerned with the feeding- in of successive rods as they are used up in turn in this operation, to say nothing of the expense of providing the glass in the form of rods, which is relatively large as compared with producing the wool directly from the molten batch.

The present invention is designed to combine the advantages and avoid the disadvantages of both of the above-mentioned methods of producing glass wool, and consists, in effect, of a combination of the foregoing methods, brought about by withdrawing a continuous stream of glass from the forehearth of a melting furnace, allowing it to cool and harden or solidify to a wax-like consistency while still highly heated, and then directing the hot glass rod thus formed into and through the metal layer machine or other reducing machine in place of the cold and solid rod heretofore thought necessary in such machine method of glass wool production.

By this combined operation, I achieve a marked saving in fuel consumption in the melting furnace, the forehearth temperature of which is not required to be higher than that necessary to the proper melting of the batch and its delivery from the boot orifice at a proper flowing temperature of about 2100°, while at the same time enabling the filament forming operation to take place at the higher temperature found necessary to the production of very fine fibers which in some instances are as small as two microns in diameter.

In the accompanying drawings:

Fig. 1 is a side elevation, partly in section, of an apparatus adapted for practicing my method of making glass wool.

Fig. 2 is a sectional view of the reducing machine for reducing or drawing the glass to fine filaments.

Fig. 3 is a side elevation, partly in section, of the apparatus assembled in a slightly different manner.

With reference to Fig. 1, the forehearth or boot 5 of the usual type of glass furnace is provided on its lower face with an orifice 6. Adjacent the furnace is a reducing machine 7 mounted on suitable supports, the machine being adapted for receiving and reducing a partially solidified flow of glass to the form of wool, as hereinafter more fully described.

The machine may be supplied with air under pressure from an air pressure tank 8. The air is conducted from the tank through a tube 9 to a burner in the machine. Oxygen is supplied from a tank 10 through a tube 11, and acetylene gas is likewise supplied from a tank 12 through a tube 13, to the burner in the machine 7. Forward of the furnace is an endless conveyor 14 mounted on any suitable support and provided with any suitable housing.

Referring to Fig. 2, the machine 7 may be the same as or similar in construction to the "metal layer" machine now in common use for feeding metal rods through a burner, melting the rods and applying the metal in the form of a spray as a surface coating on various articles. The machine is provided with a burner 15 having a passageway 16 extending throughout the length of the machine at the axis of the burner, through which the glass 17 is fed by the usual feeding mechanism.

In operation, a stream of molten glass 17 is allowed to flow from the forehearth 5 of the glass furnace through the orifice 6. This continuously flowing stream assumes a partially solidified state as it becomes cooled by the comparatively cold surrounding atmosphere so that it can be manipulated and inserted into the passageway 16 of the machine. If desired, a cooler 20 may be provided for additionally cooling and adjustably regulating the temperature of the flowing stream. The cooler comprises a chamber 21 surrounding the stream 17. Water or other cooling medium circulates in said chamber.

The feed mechanism in the machine 7 engages the advancing end of the viscous flow and feeds it forward to the burner 15. At this point the glass mass has cooled sufficiently to retain a shape and be capable of manipulation. Nevertheless, it is still at a high temperature, preferably about 1000° F. Resultantly, when it is subjected to the heat from the burner 15, it is readily remelted. Thus, the tip of the advancing mass melts away at a point immediately beyond the burner. Simultaneously, this very fluid remelted glass on the outer surface of the fast melting tip is subjected to a blast of air from the pressure tank 8, which carries away minute threads of glass. The fluid glass is drawn out by the pressure of the burner flame into a fine filament or filaments which are carried forward at a high velocity by the gases of combustion and the forward air currents induced thereby. The fine glass filaments, as they pass beyond the zone of intense heat, are immediately cooled and solidified and also disrupted from the oncoming glass. The filaments of glass thus produced rapidly accumulate to form a mass of fine glass wool. As the force of the blast is diffused and spent by the time the filaments are thrown a distance from the machine, they fall on the endless conveyor 14, by which they are carried to suitable receptacles.

It should be observed that the glass, while softening or melting and while drawn out to form fine fibers, is still connected to the unmelted flow or supply body, which serves as an anchor to hold the threads while they are being stretched out to form the filaments finally obtained by the force of the blast. This anchorage makes it possible to draw out much finer filaments than would otherwise be possible.

Referring to Fig. 3, it is seen that the machine 7 is positioned directly below the orifice 6 of the forehearth 5 in such a manner as to obviate manipulation of the stream of molten glass 17. The stream 17 will leave the orifice 6 and fall directly into the passageway 16 of the machine. The blast is directed downward and the filaments will be ejected downward onto a suitable conveyor below (not shown).

In the copending application of John H. Thomas, Jr., and myself, filed December 27, 1932, Serial Number 648,953, we have illustrated and described a method of manufacturing glass wool which, so far as general construction and method of operation of the machine is concerned, is identical with the construction and operation described above. No claim is made herein to a method of treating a preformed vitreous material by reducing it to a viscous state, and then shredding or drawing the molten glass by a blast under pressure to form filaments. The present application is directed to a method of making glass filaments by directing a stream of molten glass into the machine to blow it into filaments.

Modifications may be resorted to within the spirit and scope of my invention.

What I claim is:

1. The method of producing filamentous glass consisting of flowing a stream of glass continuously from a molten pool, reducing the temperature of the molten stream of glass to a point where it assumes a semi-solid state, and subjecting a portion of the semi-solid mass to a high temperature blast within a confined area by which the reheated portion is progressively remelted and blown from the main body of the mass to form elongated fibers.

2. The method which comprises continuously flowing a stream of glass from a pool of molten glass, and reducing the continuously flowing mass of glass to filamentous fibers, which comprises subjecting the free end of the flow to a high temperature blast while still integral with said stream and pool, and thereby causing a fluid portion to be attenuated and disrupted from the main body, and then subjecting the attenuated portion to a relatively intense cold, the temperature of said blast being higher than the temperature of said free end to cause said free end to be reheated thereby.

3. The method which comprises projecting glass from a molten pool, causing the projected glass to cool to a condition of partial solidification, and subjecting the cooled glass while still integral with the pool, to a high temperature blast and thereby raising the temperature of the glass and causing it to assume a fluent condition, and drawing it by the force of the blast to fine threads or filaments while still anchored to the comparatively cool glass.

4. The method which comprises flowing a stream of glass from a molten pool, causing said stream to cool to a condition of partial solidification, subjecting the advancing end of the stream to a blast of such high temperature and force that it causes a continuous remelting of the end of the stream by said high temperature, and a drawing of the remelted glass into fine filaments by the force of the blast.

5. The method which comprises flowing a stream of glass from a molten pool, causing said stream to cool to a condition of partial solidification, remelting the end of the stream while still integrally united with the pool, and simultaneously applying a drawing force to said end and thereby drawing the remelted glass to fine fibers.

6. The process of blowing glass into fine filaments of wool-like nature, which consists in flowing a stream of glass from a pool of molten glass contained within a tank, allowing said stream to cool to a condition of partial solidification, and then passing it while still integral with the pool through a high temperature blast by which the advancing end of the stream is drawn out into filaments of microscopic diameter.

7. The process of blowing glass into fine filaments of wool-like nature, which consists in flowing a stream of glass continuously from a pool of molten glass, applying a high temperature blast to the advancing end of the stream of glass while the latter is still integrally united with the pool, the blast being hotter than said advancing end to remelt the tip of the advancing stream and of such pressure as to reduce the remelted glass to elongated filaments of microscopic diameter.

8. The process of blowing a body of molten glass to filaments of microscopic fineness, which comprises flowing a stream of the molten glass through an open space, cooling and partially solidifying the glass and changing its direction of flow as it passes through said space, progressively heating and liquefying the advancing end of the stream, and drawing the liquefied glass to a fine filamentary form.

9. The process of blowing a body of molten glass to filaments of microscopic fineness, which comprises flowing a stream of the molten glass through an open space, cooling and partially solidifying the glass and changing its direction of flow as it passes through said space, progressively heating and liquefying the advancing end of the stream by an intensely hot blast of gas, and causing the liquefied glass to be drawn to fine fibrous form by the force of the blast and while still integral with the oncoming stream.

GAMES SLAYTER.